United States Patent

Morgan

[15] 3,677,302
[45] July 18, 1972

[54] BI-AXIAL ARTICULATING PIPELINE STRUCTURE

[72] Inventor: George W. Morgan, Anaheim, Calif.

[73] Assignee: Subsea Equipment Associates Limited, Hamilton, Bermuda

[22] Filed: March 9, 1970

[21] Appl. No.: 17,649

[52] U.S. Cl. ............................... 138/106, 9/8 P, 138/110, 138/111, 138/120
[51] Int. Cl. .................................................. F16s 7/00
[58] Field of Search .................... 9/80 P; 61/46, 46.5; 114/.5; 137/236, 236 OS; 138/106, 110–113, 120, 155; 166/.5, .6; 174/47, 70 R

[56] References Cited

UNITED STATES PATENTS

| | | | |
|---|---|---|---|
| 2,578,280 | 12/1951 | Barnard | 138/111 X |
| 1,485,394 | 3/1924 | Haynes | 138/120 X |
| 1,905,824 | 4/1933 | Dysthe | 138/120 |
| 2,175,749 | 10/1939 | Eckman | 138/111 UX |
| 3,017,934 | 1/1962 | Rhodes et al. | 174/70 UX |
| 3,366,088 | 1/1968 | Gibson | 9/80 P X |

Primary Examiner—Edward J. Earls
Attorney—Allan Rothenberg, Richard F. Carr and Richard L. Gausewitz

[57] ABSTRACT

A riser is disclosed wherein a plurality of substantially rigid pipes are enclosed within a larger outer pipe. The outer pipe is divided into rigid sections that are hinged together to allow the riser to bend on a bending axis normal to the riser axis. Alternate bending axes are disposed normal to the interstitial bending axes. The larger of the enclosed pipes are disposed along the diameter that coincides with the bending axes whereby the pipes form a helical twist of 90° to the next hinged-connection. The other enclosed pipes are layed spaced from and near to these larger pipes also in a helically twisting fashion thereby preserving their individual flexibility.

6 Claims, 5 Drawing Figures

PATENTED JUL 18 1972

INVENTOR.
G. W. MORGAN

BY Dominick Nardelli

ATTORNEY

INVENTOR.
G. W. MORGAN

BY Dominick Nardelli
ATTORNEY

BI-AXIAL ARTICULATING PIPELINE STRUCTURE

This invention relates to underwater pipeline and more particularly to pipes combined in a group which requires some degree of flexibility.

In my U.S. Pat. No. 3,526,086, there is disclosed an underwater pipeline wherein a plurality of conduits are layed in a helical configuration around a central core member which is capable of withstanding a relatively high tensile load. Although the conduits are wrapped to form a bundle, the wrapping is complex and expensive if the same flexibility, as in a single pipe, is to be maintained in the bundle.

Therefore, an object of this invention is to provide a relatively flexible bundle of pipelines that is economical to fabricate.

Another object of this invention is to provide a plurality of pipelines enclosed within an outer steel casing and the steel pipe has substantially the flexibility as the flexibility in one pipeline.

Another object of this invention is to provide a plurality of pipelines enclosed in a steel casing wherein the casing is made up of sections that are connected together with hinges and wherein the bending axes of two adjacent hinged joints are not parallel, preferably the axes being orthogonal.

These and other objects and features of advantage will become apparent from the following detailed description of an illustrative embodiment of the invention, reference being made to the accompanying drawings wherein.

Figures 1, 2:
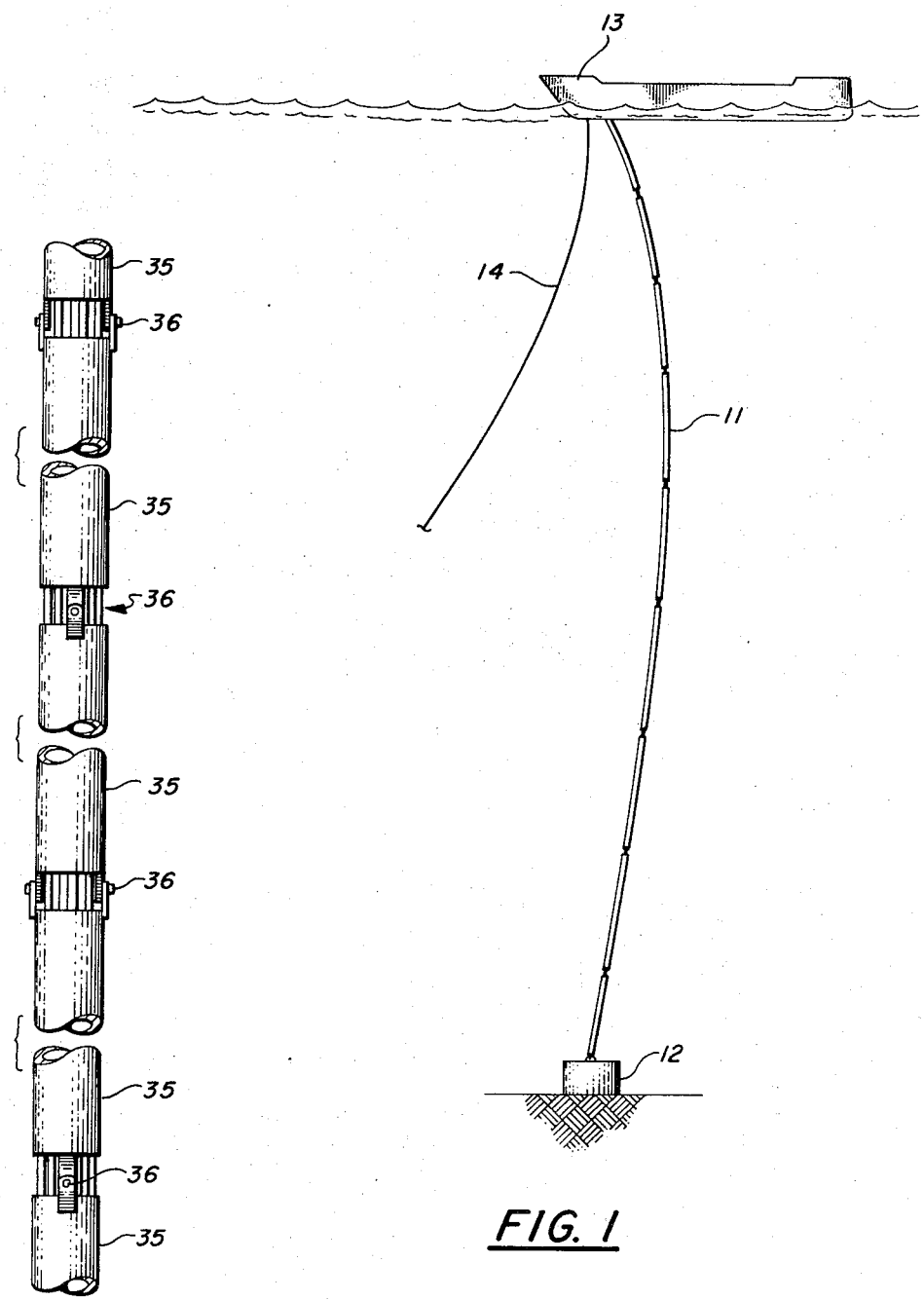
FIG. 1 is a schematic showing a typical riser connecting an undersea tank to a moored ship.
FIG. 2 is an enlarged elevation of a portion of the riser incorporating the teachings of this invention.
Figure 3:
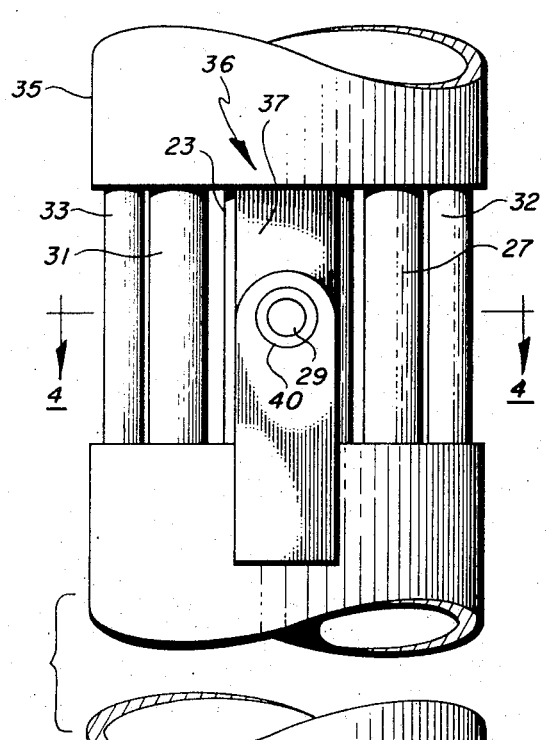
FIG. 3 is a further enlarged elevation of a portion of the riser of FIG. 2.
Figure 3:
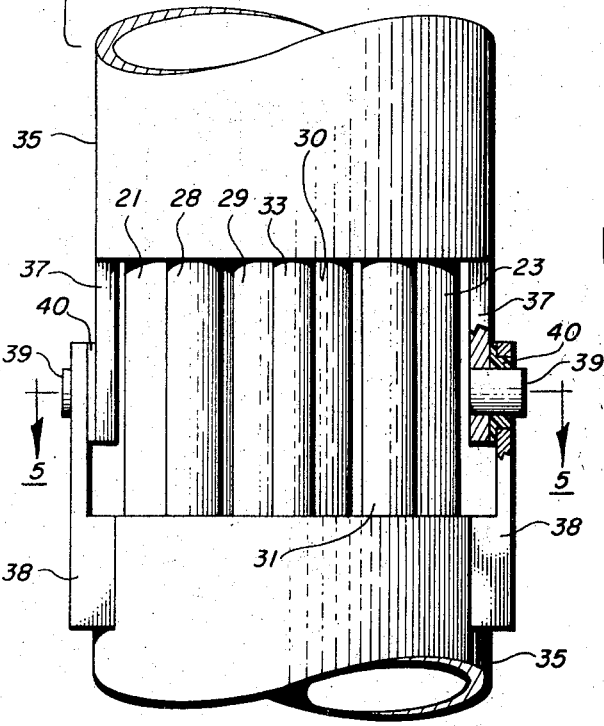

Referring to the drawing and to FIG. 1 in particular, a typical system utilizing a riser 11 is shown. The riser 11 comprises a plurality of pipes and conduits that transfer material, fluids and power from an undersea station 12 to a floating ship 13 or from the ship to the station. The depth of water is, for example, 2,000 feet. The ship 13 is moored and held in place by suitable mooring lines 14 of which one is shown. Since the sea has tides and the mooring lines 14 stretch, the ship 13 moves relatively large distances from a point over the station 12. Therefore the riser 11 needs to be relatively flexible. A single steel pipe ten inches in diameter, that would extend between the undersea station 12 and the ship 13, would have the required flexibility to absorb the largest excursion of the ship, but a larger diameter steel pipe would be inherently less flexible. Since, for example, thirteen steel pipes may be used to make up the riser 11, the overall diameter of the bundle would be relatively large making the bundle stiff. The above-mentioned patent application teaches twisting the pipes into a helix to increase the flexibility. However, this requires suitable bearing material between the pipes to keep the pipes from rubbing together and wearing away.

Referring to FIGS. 2, 3, 4 and 5, this invention teaches the feature of loosely enclosing the pipes such as pipes 21–33 within casing sections 35 that are joined together by suitable hinges 36 that are disposed in pairs between two pipe sections. The pair of hinges 36 between two adjacent sections 35 are disposed on opposite sides of the axis of the riser, thereby allowing the two adjacent sections 35 to bend on a bending axis normal to the axes of the sections. In turn, the pair of hinges joining the adjacent section 35 thereto is disposed to allow bending on another bending axis that is normal again to the axes of the sections and also normal to the adjacent bending axis as shown. Thus, the casing sections bend relative to each other so that the complete riser is free to articulate in any horizontal direction without requiring the riser to rotate relative to the ocean floor.

Figure 4:
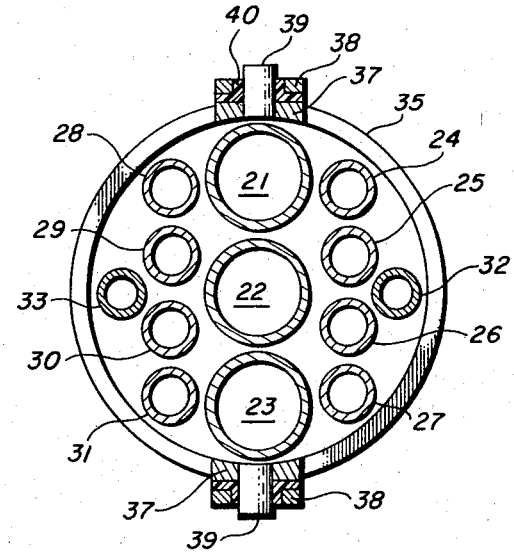
FIG. 4 is a section of the riser taken on line 4—4 in FIG. 3 and in the direction of the arrows.
Figure 5:
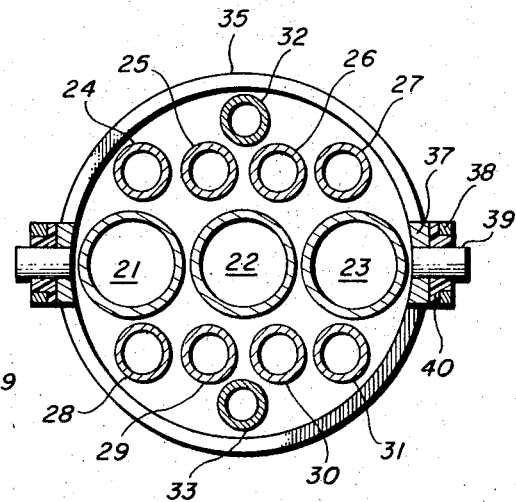
FIG. 5 is a section of the riser taken on line 5—5 in FIG. 3 and in the direction of the arrows.

Since the riser is relatively long, about 2,000 feet, and the radius of curvature in the worst condition is also relatively large, each section 35 (being made of, for example, 30-inch diameter pipe) can be made to be about 100 feet long. Each hinge 36 comprises a bar 37 butt-welded to the end of one section 35 and another bar 38 lap-welded to one end of another section 35. Each bar 37 has a pivot pin 39 welded thereto as shown in FIGS. 4 and 5. Therefore, bars 38 are welded to sections 35 after pin 39 is inserted into the aperture in bar 38. Thus when the outer casing is assembled, the sections are inherently locked together. To provide low friction bearing surfaces, a suitable plastic washer 40 made of, for example, polytetrafluoro-ethylene can be disposed between pin 39 and bar 38 and between the bars 37 and 38 as shown.

The pipes 21–33 are arranged within the sections 35 as shown in FIGS. 4 and 5. The three largest pipes 21, 22 and 23 are disposed along the diameter connected to the pair of hinges 36. Since the diameter joining one pair of hinges is oriented at 90° or at right angles to the diameter joining the adjacent pair, pipes 21 and 23 form a helical twist around pipe 22 so that the three pipes 21, 22 and 23 are also aligned on the diameter joining the pair of hinges at the adjacent hinged joint 36. The other pipes 24–33 can be arranged as shown in FIGS. 4 and 5. Sufficient spacing is provided between the pipe so that the bundle flexes freely and the pipes do not rub against each other with any appreciable pressure to cause wear.

With the present disclosure in view, modification thereof would appear to those skilled in the art. Accordingly, the invention is not limited to the illustrated embodiment but includes all such modifications and variations within the scope of the invention as defined in the appended claims.

What is claimed is:

1. A pipeline comprising:
   a plurality of pipes having different diameters,
   a substantially rigid outer casing enclosing said plurality of pipes,
   said outer casing being comprised of sections disposed end to end,
   means for connecting said sections together to allow two adjacent sections to bend about a bending axis normal to the outer casing axis while tension is maintained in said outer casing,
   two adjacent bending axes being disposed in non-parallel relationship to each other, and
   the longitudinal axes of largest diameter pipes being disposed to intersect each one of said bending axis to inhibit undue bending stresses in the pipes.

2. The pipeline of either claim 1, wherein:
   said means include a pair of hinges connecting two sections together.

3. The pipeline of claim 2 wherein:
   said plurality of pipes are helically disposed within said outer casing.

4. The pipeline of claim 3 wherein:
   the two adjacent bending axes are further disposed to be orthogonal to each other.

5. The pipeline of claim 2 wherein:
   the two adjacent bending axes are further disposed to be orthogonal to each other.

6. The pipeline of claim 1 wherein the two adjacent bending axes are further disposed to be orthogonal to each other.

* * * * *